US007680447B2

(12) United States Patent
Mestres et al.

(10) Patent No.: US 7,680,447 B2
(45) Date of Patent: Mar. 16, 2010

(54) METHOD AND APPARATUS FOR DUPLICATING SECURE DOCUMENTS

(75) Inventors: Jean-Christophe Mestres, Vence (FR); Jean-Louis Veran, La Colle sur loup (FR)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 11/536,222

(22) Filed: Sep. 28, 2006

(65) Prior Publication Data

US 2007/0157826 A1 Jul. 12, 2007

(30) Foreign Application Priority Data

Nov. 15, 2005 (EP) .................................. 05300921

(51) Int. Cl.

*B41J 29/38* (2006.01)
*B41J 29/00* (2006.01)
*G06F 3/12* (2006.01)
*H04N 1/00* (2006.01)

(52) U.S. Cl. ....................... 399/363; 399/365; 399/366; 399/381; 358/1.14

(58) Field of Classification Search ....................... None
See application file for complete search history.

(56) References Cited

U.S. PATENT DOCUMENTS

2005/0024393 A1 * 2/2005 Kondo et al. .................... 347/2
2005/0105724 A1 * 5/2005 Hull et al. .................... 380/200
2005/0141009 A1 * 6/2005 Kiwada ...................... 358/1.14

FOREIGN PATENT DOCUMENTS

JP 2004320080 A * 11/2004

* cited by examiner

*Primary Examiner*—Daniel J Colilla
(74) *Attorney, Agent, or Firm*—Norman Gundel; Hoffman Warnick LLC

(57) ABSTRACT

A method of securely duplicating in a copying machine a document which includes a readable security device. A method in accordance with an embodiment of the present invention includes: reading the readable security device to determine contents of the readable security device; copying the document; generating a copy of the readable security device that includes data which is determined from the contents of the readable security device; and attaching the copy of the readable security device to the copy of the document before the copy of the document exits the copying machine to generate a secure duplicate of the document.

16 Claims, 3 Drawing Sheets

METHOD AND APPARATUS FOR DUPLICATING SECURE DOCUMENTS

FIELD OF THE INVENTION

The present invention is directed to the area of secure or confidential documentation, and more particularly to a method and system for duplicating and tracking copies of secure documents.

BACKGROUND OF THE INVENTION

There are many environments where it is necessary to duplicate confidential documents. For example, patient files may need to be duplicated from one doctor to another doctor. In addition, in an office environment there are often documents relating to new projects, new products, etc., which may well be confidential to the company.

Without adequate security measures it is very easy for a confidential document of this type to be sent to people who should not be receiving the information contained therein. This is often done by people copying the confidential document and then putting it in an envelope and sending it as mail. The mail is not always opened by the person for whom it was intended, sometimes being opened by a secretary or other member of staff. This means that very often confidential documents are read or fall into the hands of people who should not see them or should not have them.

In addition, the document may be copied many times and the person who owns the document may not know how many copies are in circulation. It would obviously be better for the owner of the document to have an indication of how many documents are in circulation in order to control and retrieve the document should the need arise.

A certain number of proposals exist on the subject of copying and securing confidential documents. In several of these proposals, the suggestions of including a tag with the document are described. In one the tag serves to enable or disable a copier from authorizing or not the printing of a copy. This can be overcome by removing the tag or just using a different copier. This system is not generally sufficient to overcome the known problems in this field.

In another example the tags allow the identification of a relevant tray in a copier to be used. The tray includes a pre-tagged sheets of paper which enable a tagged and confidential document to be copied onto another tagged and confidential document.

A disadvantage of the second example is that the pre-tagged pages do not have any indication of the type of document that is being copied and do not include any information relating particularly to that document. All tagged documents are therefore the same, merely indicating that the document is confidential and nothing more. There is no way of knowing (without looking at the copied documents) which documents have been copied and how many times.

SUMMARY OF THE INVENTION

The present invention overcomes at least some of the problems of the prior art. In addition, the invention seeks to provide a means of copying a document in such a way that insures that all information relating to this document and security level etc., are captured.

The present invention provides a method of securely duplicating in a copying machine a document that includes a readable security device, the method comprising:

reading the readable security device to determine contents of the readable security device;

copying the document;

generating a copy of the readable security device that includes data which is determined from the contents of the readable security device; and attaching the copy of the readable security device to the copy of the document before the copy of the document exits the copying machine to generate a secure duplicate of the document.

The present invention provides a dynamic document copying system for confidential documents in which tags are used. This includes the level of confidentiality and all other information on the tag associated with the original document. It also permits the ability to trace all documents and confidential copies of the documents with a minimum amount of effort.

BRIEF DESCRIPTION OF THE DRAWINGS

Reference will now be made, by way of example, to the accompanying drawings.

DETAILED DESCRIPTION OF THE INVENTION

Figure 1:
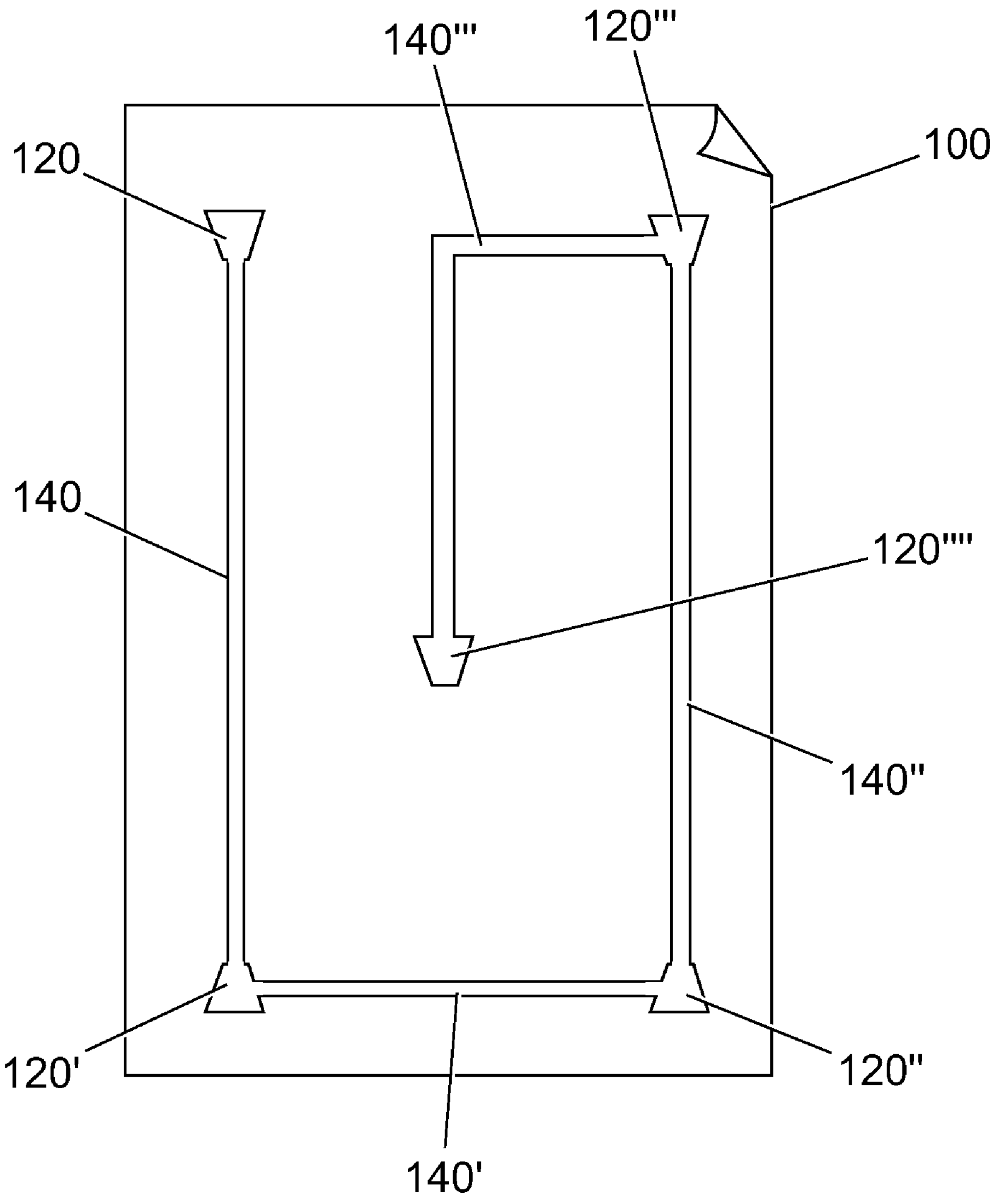
FIG. 1 is diagram showing a tag incorporated into a sheet of paper.

Referring initially to FIG. 1, a tag 100 is shown. This tag 100 is intended to be fixed to a confidential document or a copy of a confidential document. The tag 100 is a radio frequency identification (RFID) device which includes a number of elements 120, 120', 120", etc. The elements 120, 120', 120", etc., are connected by connections 140, 140', 140", etc., which join the elements 120, 120', 120", etc., together to form a chain. The tag 100 is readable by any RFID reader which is close to the tag 100. This will enable reading of any information stored on the tag 100 and provide location information regarding the document. If there are any breaks in the chain formed by the elements 120, 120', 120", etc., and connections 140, 140', 140", etc., for example, if someone has tampered with the tag 100, an alarm will be triggered when the document is carried past a point of control. Further details of this will be described in greater detail below.

If some/all of the elements 120, 120', 120", etc., of the tag 100 are broken or damaged, the document may become illegible. Due to its position on the paper on which the document is printed, removing the tag 100 will destroy the paper and the document will thus become unreadable.

The tag 100 is fixed to a piece of paper or other suitable media onto which a confidential document is to be printed. The tag 100 can be surface mounted or located internally between layers of the paper. The tag 100 can be placed at any location on or in the surface of the paper. Accordingly, the tag 100 includes fixing means (not shown) which can be of any nature depending on the circumstances and requirements of the user fixing the tag 100 to the paper. Examples include glue or other adhesives.

It should be noted that any other type of tag 100 may be used. In this example the tag 100 is a radio frequency identification device (RFID) tag, although any other tag may be used that has the same functionality.

Figure 2:
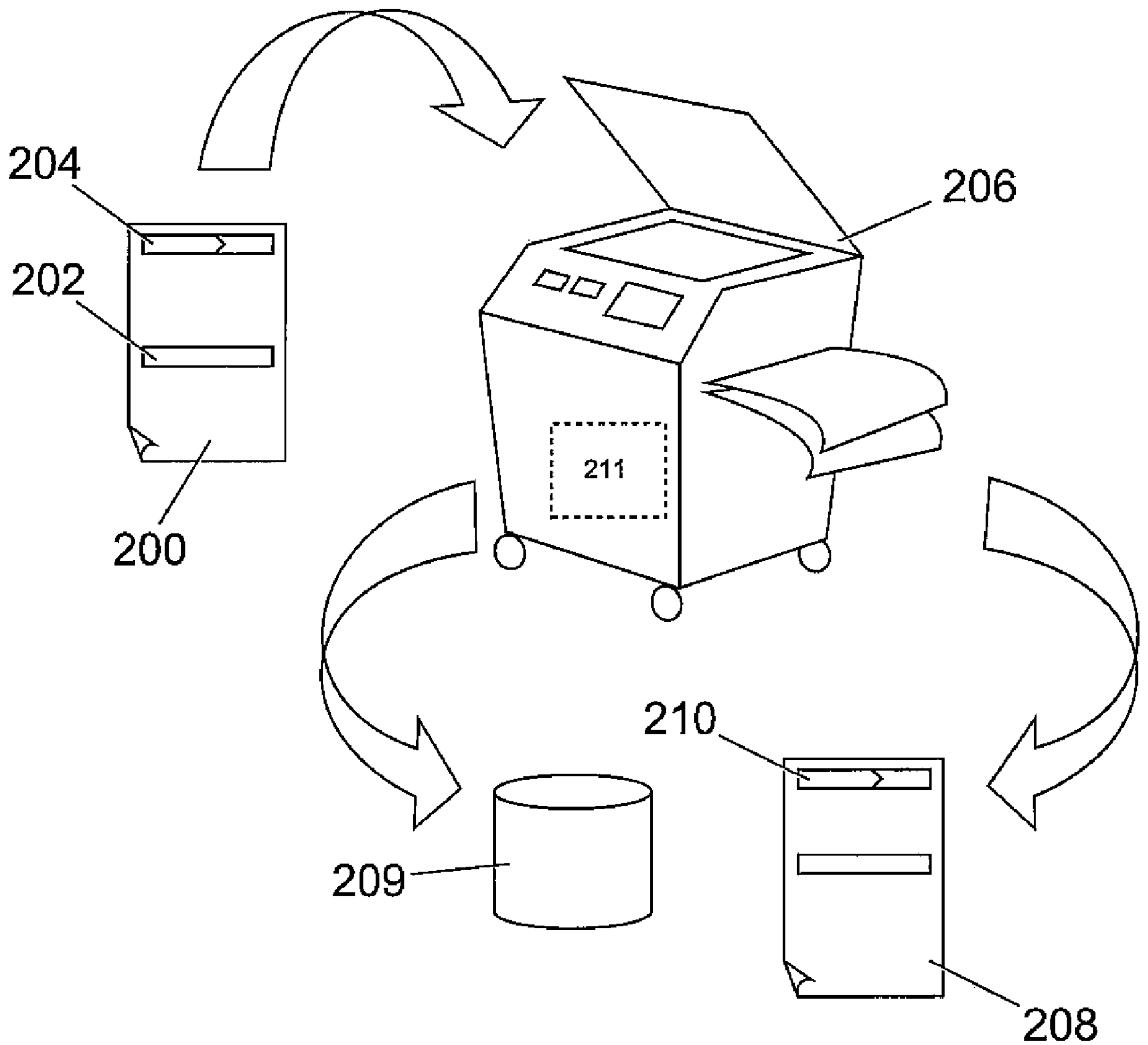
FIG. 2 is a schematic diagram showing how a confidentially tagged document can be copied to produce a secured duplicate of the original document.

Referring now to FIG. 2, an original confidential document 200 is shown with a confidentiality marking 202 and a confidentiality tag 204. The tag 204 can be the same as that shown in FIG. 1 or any other appropriate type of tag. In one embodiment of the present invention the tag 204 is an RFID tag. Once the document 200 with the associated tag 204 is in existence it can be passed from one person to another, but there will normally remain only one copy. When the tag 204 in an RFID tag, the location of the document 200 can be identified using the RFID tag 204 and associated RFID readers in the environment where the document 200 is located. Any attempt to remove the document 200 from an area from which it is not allowed to be removed will generate an alarm, thereby preventing users from taking the document 200 from one place to another place that is not permitted. Also, anyone tampering with the RFID tag 204 or trying to remove the RFID tag 204 from the document 200 will generally damage the chain of elements 120, 120', 120", etc., (FIG. 1) of the RFID tag 204. This will affect the manner in which a reader reads the RFID tag 204 and can then be used to produce an alarm.

Accordingly, there can be a number of RFID readers in the environment where a confidential document 200 according to the present invention is located. In the event that a user wishes to copy such a confidential document 200, it will be necessary to use a photocopier 206 or equivalent device. The photocopier 206 or equivalent device can be equipped with an RFID reader which can read the RFID tag 204 associated with the document 200.

When a user wishes to duplicate or otherwise copy a confidential document 200 equipped with a RFID tag 204 in accordance with the present invention, the user will bring the document 200 to a photocopier 206 or equivalent device.

The photocopier 206 can read the RFID tag 204 (e.g., using a suitable RFID reader) in order to facilitate copying of the document 200. The photocopier 206 can request the introduction or insertion of a password. If the password is accepted the process of copying can continue. One step of the copying process includes reading the full details of the RFID tag 204 and writing the contents of the RFID tag 204 to a new RFID tag 210. The original document 200 is then copied and the new RFID tag 210 is pasted or fixed in some other manner onto the copy 208 of the original document 200. The result is an identical copy 208 of the original document 200 including an RFID tag 210 as in the original. A trace of the copy (including document type and security level, hour tag, copier number, user login, etc.) is recorded in a central database 209.

The new RFID tag 210 can include identical information to the original RFID tag 204 or may include slightly different information. For example, the new RFID tag 210 can include an identification number to indicate the copy number of the document 200. For instance, the original document 200 can be called document 0, the first copy can be called document 1, the second copy document 2, and so on.

The process of attaching the new RFID tag 210 to the copy 208 of the document 200 can be carried out in number of different ways:

The new RFID tag 210 can be attached using an attaching system 211 to the paper onto which the document 200 is copied during the copying process.

The new RFID tag 210 can be attached using the attaching system 211 to the copy 208 of the document 200 as the copy 208 exits the photocopier 206.

The paper onto which the document 200 is copied can include a blank RFID tag 210 which is subsequently programmed using an RFID writer (not shown) associated with the photocopier 206.

Figure 3:
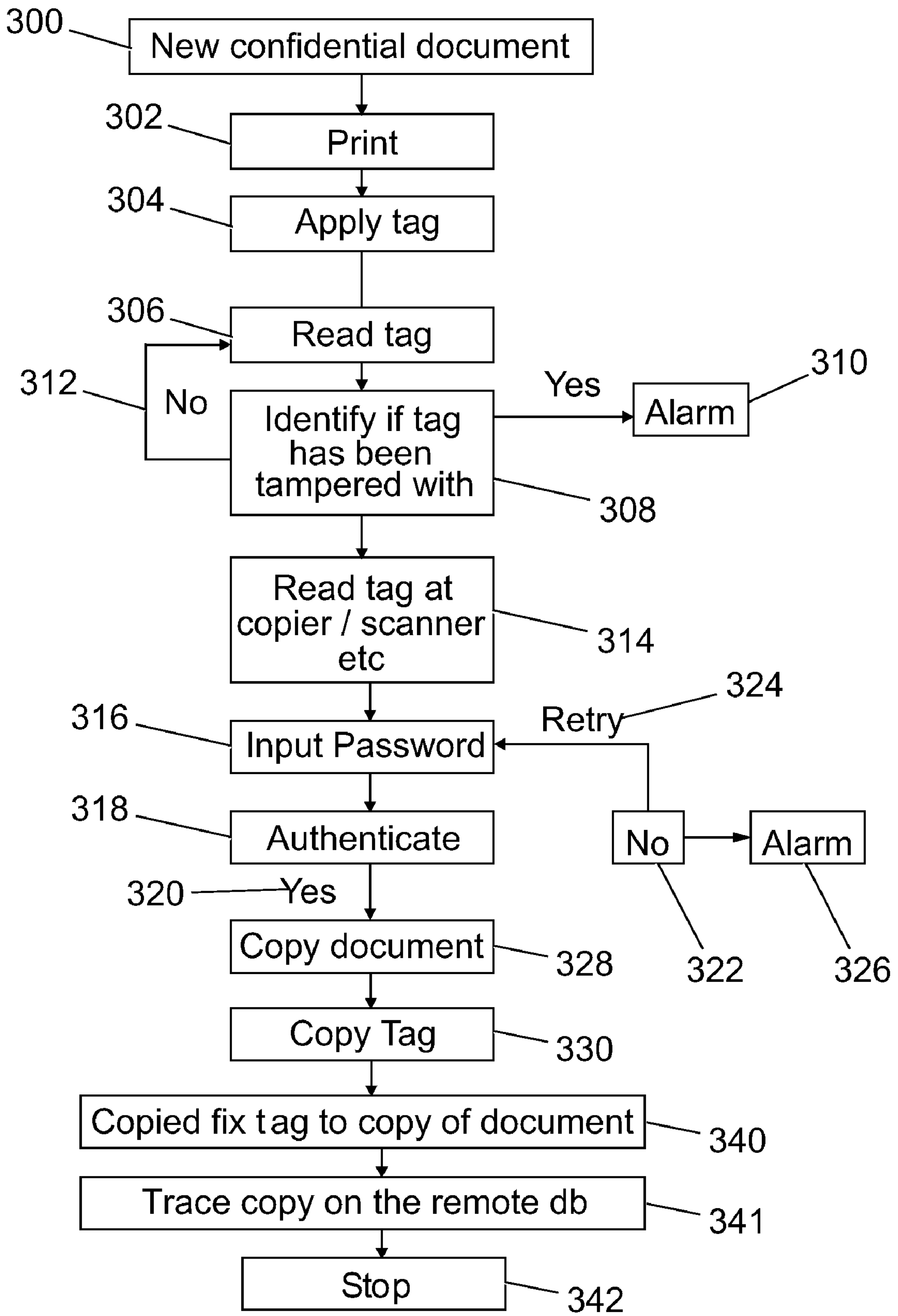
FIG. 3 is a flow chart of a method in accordance with the present invention.

Referring now to FIG. 3, a illustrative flow chart of a process of the present invention is shown. First, a new confidential document is generated (300). This document is then printed (302). A security tag of the type shown in FIG. 1 is applied to the document (304). It will be appreciated that this type of tag is only one example of the type of tag that may be attached at this stage. At regular locations around the environment in which the document is found there may be RFID readers. If the document is carried passed or in the environment of a RFID reader, the RFID reader will identify the existence of the RFID tag and read the tag (306). The reader will interrogate the tag and determine if the tag has been tampered with in any way. At the point of identification (308) as to whether the tag has been tampered with, a yes or no will be determined. If the tag has been tampered with (yes) an alarm will be generated (310). The document can then be checked with regard to its security. If there is no tampering of the tag there would be no action taken until the next time the document passes a tag reader (312).

At a later time, the user of a document may wish to copy, scan or otherwise make duplicates of the original document. The document is taken to the appropriate machine for effecting this duplication. For example, in a case of a copier the document is taken to a copier, the copier includes a RFID tag reader (or read/writer) incorporated within the body thereof. The RFID reader in the copier reads the tag at the copier (314).

The user may be asked to input a password to confirm that they have the authority to make copies of the relevant document (316). The password may be determined from the contents of the tag or by any other appropriate means. If the password is authenticated (318), the document will continue to the next stage (320). However if the password is not authenticated (322), the user will be invited to reenter the password (324). If the second entry of the password is not authenticated an alarm may be generated (326). The addition of the passwords may be only one way in which authentication of a permission to make copies is made. Others may include taking fingerprints or other known devices and methods for authenticating the right of a user to carry out certain acts. In addition, the authentication process is an optional process and may not be included at all.

The copier copies the document (328) and makes a paper copy of the original page or pages of the document. Further, for each page of the document that is copied, the copier makes a copy of the RFID tag for the corresponding original page (330), and affixes the copy of the RFID tag to the copy of that page (340). To trace all the copies made (even copies of a copy), a central database will record all the copying of a certain tagged document (341). Once this is completed the process stops (342).

This invention may be relevant to other fields other than in domain of confidential documentation. For example, the invention may be relevant in the environment of videos and DVDs where copies may be made and the technology of applying a tag or some sort may be also relevant.

Because the copy of the document is now equipped with an RFID tag similar to the original document, any attempt to remove the document from a designated area in which the document is to be kept will be identified by the generation of an alarm as previously described. In addition, when the paper is in an envelope and is to be sent to someone, the alarm will similarly be generated. Then, without opening the envelope, a security team will be able to check whether this document is allowed to be forwarded or posted to the address indicated on the envelope. In this way the confidential information would be maintained within the envelope and will not need to be read by people other than the intended recipient.

The particular nature of the RFID tag size, shape and type (read only), will be design in such a way that if an attempt to remove the tag the paper copy is made, the paper copy will be physically destroyed.

While the invention has been particularly shown and described with reference to a preferred embodiment, it will be understood that various changes in form and detail may be made therein without departing from the spirit, and scope of the invention.

The invention claimed is:

1. A method of securely duplicating in a copying machine a document that includes a readable security device, the method comprising:

reading the readable security device to determine contents of the readable security device;

copying the document;

generating a copy of the readable security device that includes data which is determined from the contents of the readable security device and that includes a distinct identification number to indicate a copy number of the document;

attaching the copy of the readable security device to the copy of the document before the copy of the document exits the copying machine to generate a secure duplicate of the document; and storing information regarding the copying of the readable security device to provide a trace of each copy of the document and any copies of the copy of the document.

2. The method of claim 1, further comprising:

identifying from the contents of the readable security device whether copying of the document is permitted; and preventing copying of the document if copying of the document is not permitted.

3. The method of claim 1, further comprising:

identifying from the contents of the readable security device whether a password is required to allow copying of the document;

determining the password from the contents of the readable security device;

prompting a user to enter a password;

comparing the entered password with the password stored in the contents of the readable security device; and if the entered password matches the password stored in the readable security device, allowing a copy of the document to be made.

4. The method of claim 1, wherein the readable security device comprises a radio frequency identification (RFID) device.

5. The method of claim 1, wherein the readable security device comprises an adhesive tag which adheres to the document.

6. The method of claim 1, wherein the document comprises a confidential document, and wherein the copying machine comprises a photocopier.

7. The method of claim 1, wherein the copying machine includes a radio frequency identification (RFID) reader for reading the contents of the readable security device.

8. The method of claim 1, further comprising:

tracking a location of the document or the secure duplicate of the document.

9. A system of securely duplicating in a copying machine a document that includes a readable security device, comprising:

a system for reading the readable security device to determine contents of the readable security device;

a system for copying the document;

a system for generating a copy of the readable security device that includes data which is determined from the contents of the readable security device and that includes a distinct identification number to indicate a copy number of the document;

a system for attaching the copy of the readable security device to the copy of the document before the copy of the document exits the copying machine to generate a secure duplicate of the document; and a system for storing information regarding the copying of the readable security device to provide a trace of each copy of the document and any copies of the copy of the document.

10. The system of claim 9, further comprising:

a system for identifying from the contents of the readable security device whether copying of the document is permitted; and a system for preventing copying of the document if copying of the document is not permitted.

11. The system of claim 9, further comprising:

a system for identifying from the contents of the readable security device whether a password is required to allow copying of the document;

a system for determining the password from the contents of the readable security device;

a system for prompting a user to enter a password;

a system for comparing the entered password with the password stored in the contents of the readable security device; and a system for allowing a copy of the document to be made, if the entered password matches the password stored in the readable security device.

12. The system of claim 9, wherein the readable security device comprises a radio frequency identification (RFID) device.

13. The system of claim 9, wherein the readable security device comprises an adhesive tag which adheres to the document.

14. The system of claim 9, wherein the document comprises a confidential document, and wherein the copying machine comprises a photocopier.

15. The system of claim 9, wherein the copying machine includes a radio frequency identification (RFID) reader for reading the contents of the readable security device.

16. The system of claim 9, further comprising:

a system for tracking a location of the document or the secure duplicate of the document.

* * * * *